UNITED STATES PATENT OFFICE.

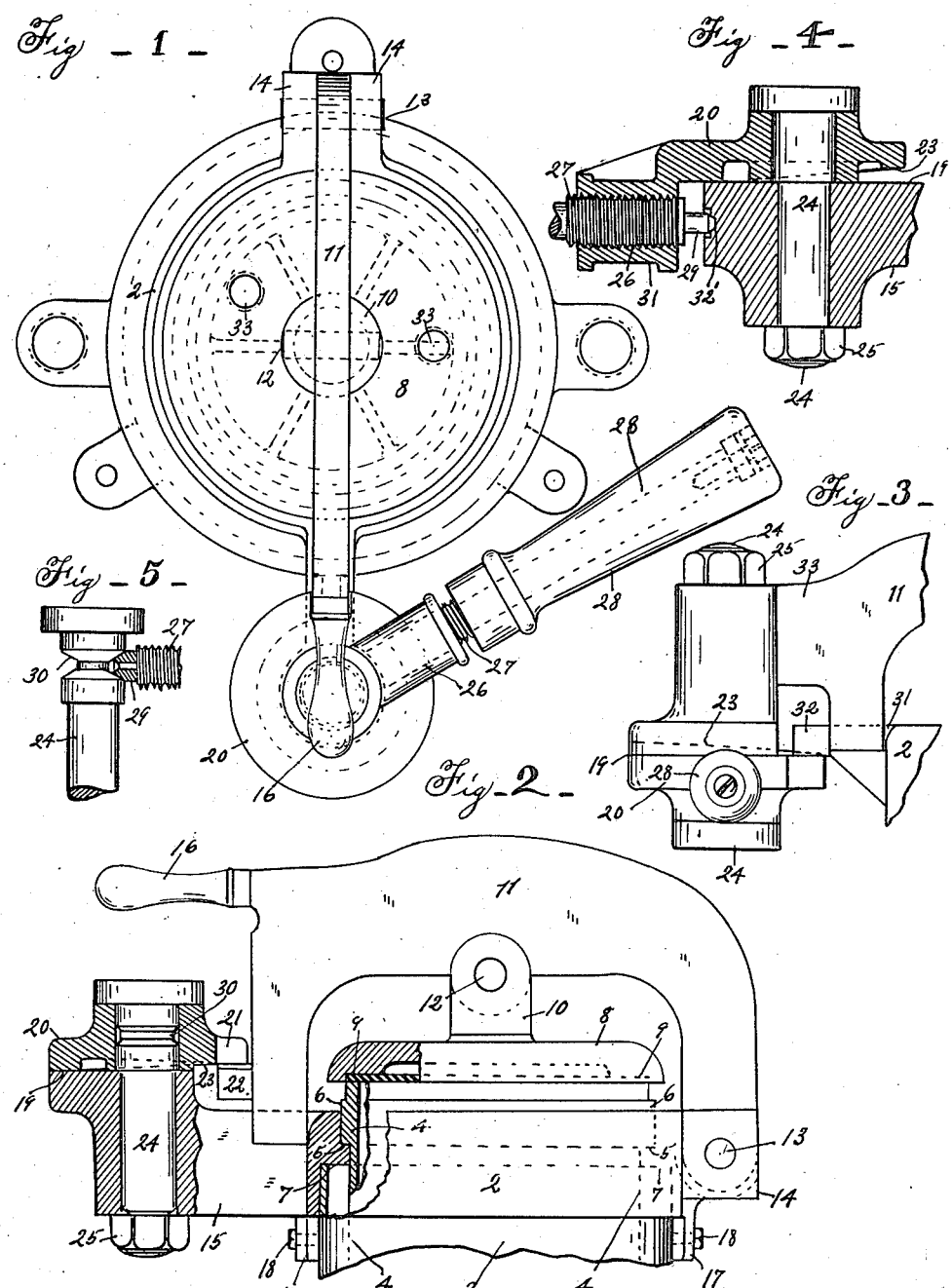

ALEXANDER CAMPBELL, OF LOS ANGELES, CALIFORNIA.

COVER CLAMP AND LOCK.

1,060,162.  Specification of Letters Patent.  Patented Apr. 29, 1913.

Application filed March 19, 1912. Serial No. 684,920.

*To all whom it may concern:*

Be it known that I, ALEXANDER CAMPBELL, a citizen of the United States of America, residing at Los Angeles, in the county of Los Angeles, State of California, have invented a certain new and useful Cover Clamp and Lock; and I do hereby declare the following to be a full, clear, and exact description of the invention, such as will enable others skilled in the art to which it appertains to make and use the same.

This invention relates to an improved cover clamp and lock, and it may be said to consist in the provision of the novel features and in the novel and improved construction, arrangement and combination of parts of the mechanism as will be apparent from the description and claims which follow.

Objects of the invention are to provide mechanism of the nature specified, which is simple in character, strong and durable, economical to manufacture, easy to operate, convenient to use, and effective in action.

Other objects and the advantages of the invention will be apparent to those skilled in the art from a consideration of the following description of preferred forms of construction embodying it, taken in connection with the accompanying drawings in which, Figure 1 is a top plan view of apparatus having the invention applied thereto; Fig. 2 is a partly broken and sectional elevation of the upper portion of the apparatus, looking from right to left of Fig. 1; Fig. 3 is a fragmentary view of a modified arrangement for the cam and parts associated therewith; Fig. 4 is a fragmentary sectional view of another modified arrangement for the cam and associated parts; and Fig. 5 is an enlarged fragmentary view of the locking device for the mechanism shown in Figs. 1 and 2.

In the several views, similar characters refer to substantially similar parts.

Referring to Figs. 1, 2 and 5, the pot or boiler holder 2 is adapted to be fitted over the top end portion of any suitable casing 3 for forming a heating chamber into which the pot or boiler 4 extends when it is placed in the holder 2.

As shown, the casing 3 of the heating chamber may be formed circular and diverging downwardly to its base. With the casing 3 of this form, the pot or boiler holder 2 may be ring shaped and be provided with an annular shoulder 5 on which may rest the annular flange 6 on the upper end portion of the pot or boiler 4. An annular shoulder 7 may also be provided on the holder 2 to engage with the top edge of the casing 3 when the holder 2 is placed in position on said casing 3.

On the top of the pot or boiler 4 may be fitted a cover 8, a gasket 9 being interposed between the top edge of the pot or boiler 4 and the underside of the cover 8. Upstanding lugs 10 may be provided substantially centrally on the top of the cover 8, and a yoke 11 may have a portion thereof disposed between the lugs 10. A pin 12 may connect the yoke 11 to the lugs 10.

One end portion of the yoke 11 is mounted on a pivot 13 which has the end portions thereof disposed in lugs 14 on the holder 2, and the other end portion of the yoke 11 is formed bifurcated and is adapted to fit over the projecting part 15 on the holder 2. A lifting handle 16 may be affixed on the yoke 11. Depending lugs 17 may be provided on the lugs 14 and on the projecting part 15, whereby the holder 2 may be fastened to the casing 3 by means of screws 18 passing through said lugs 17 and engaging with the casing 3. On the flat surface 19 on the outer end of the projecting part 15 may be disposed a cam 20 having an inclined portion 23 on the underside thereof and provided with a slot 21 permitting passage therethrough of the projection 22 on the yoke 11. The cam 20 is held rotatively in position on the flat surface 19 by the bolt 24 which, as seen in Fig. 3, may pass through the cam 20 and projecting part 15 and is held stationary and locked to the projecting part 15 by jamming the nut 25 on said bolt against the projecting part 15. The cam 20 has thereon a socket 26 into which is screwably fitted the threaded part 27 on the handle 28 for turning the cam 20. The end 29 of the part 27 is formed tapering and is adapted, when the handle 28 is turned in the socket 26, to fit into and engage with the walls of a groove 30 in the bolt 24 whereby the handle and consequently the cam 20 may be locked in position.

In the form of construction for the mechanism shown in Fig. 3, the end portion of the yoke 11 is adapted to extend into a socket 31 in a projecting part 32 on the pot or boiler holder 2. In this case the lifting handle 16 on the yoke 11 is dispensed with and a projection 33 is provided on the yoke 11 and carries thereon, in inverted position, parts similar to those carried by the projecting part 15. Also in this case the cam 20 is adapted to bear against the underside of the projection 32 instead of against the upper side of the projection 22, and the handle 28 serves a further purpose in that it is made use of to lift the yoke 11 and the cover 8 connected thereto.

As shown in Fig. 4, the groove 30 in the bolt 24 may be dispensed with, and the cam 20 may be provided with a depending portion 31 in which the threaded part 27 is adapted to screw to permit the end portion thereof to be moved into engagement with the walls of the groove 32' formed in the part 15.

Openings 33 may be provided in the cover 8 for the insertion of pressure gages, thermometers, or the like.

From the foregoing the use and operation of the mechanism will be readily understood—it being seen that when the yoke 11 is positioned to fit the cover 8 on the top of the pot or boiler 4, the cam 20 may be turned by handle 28 to bear strongly against the projection 22 or 32 to clamp the cover in position, and then the handle 28 may be turned to have the end portion of the threaded part 27 thereon wedged in the groove 30 or 32' to lock the handle 28, cam 20, and cover 8 in position.

I claim:

1. The combination of a casing, a pot holder affixed on the casing and provided with a shoulder, a pot provided with a flange adapted to fit on said shoulder, a cover adapted to fit on the pot, a yoke pivotally mounted on the holder and connected with the cover, projecting parts on the yoke and holder, and means including a cam on one of the parts adapted to coact with the other of the parts to clamp said cover in position on the pot.

2. The combination of a casing, a pot holder affixed on the casing and provided with a shoulder, a pot provided with a flange adapted to fit on said shoulder, a cover adapted to fit on the pot, a yoke pivotally mounted on the holder and connected with the cover, projections on the yoke and holder, and means including a cam rotatively mounted on one of the projections adapted to coact with the other of the projections to clamp the cover in position on the pot, and means including a handle to turn the cam and lock it in adjusted position.

3. The combination of a pot holder, a pot fitted thereon, a cover adapted to fit on the top of the pot, a yoke pivotally mounted on said holder and connected with said cover, projections on the yoke and holder, a cam rotatively mounted on one of said projections and adapted to coact with the other of said projections to clamp the cover in position on the pot, and a handle for turning the cam, said handle adjustably mounted on the cam and having a part thereon adapted to fit in a groove to lock the handle in position, substantially as described.

In testimony whereof, I have signed my name to this specification in the presence of two subscribing witnesses at Los Angeles, county of Los Angeles, State of California, this 8th day of March A. D. 1912.

ALEXANDER CAMPBELL.

Witnesses:
H. S. PAYNE,
A. H. LIDDERS.

---

Copies of this patent may be obtained for five cents each, by addressing the "Commissioner of Patents, Washington, D. C."